United States Patent
Song et al.

(10) Patent No.: US 8,419,976 B2
(45) Date of Patent: Apr. 16, 2013

(54) POLYELECTROLYTE COMPLEXES AS THICKENERS FOR HIGH IONIC STRENGTH SALT SOLUTIONS

(75) Inventors: Zhiqiang Song, Newtown, CT (US); Jianwen Mao, New Milford, CT (US)

(73) Assignee: BASF SE, Ludwigshafen (DE)

( * ) Notice: Subject to any disclaimer, the term of this patent is extended or adjusted under 35 U.S.C. 154(b) by 785 days.

(21) Appl. No.: 11/988,969

(22) PCT Filed: Jul. 12, 2006

(86) PCT No.: PCT/EP2006/064119
§ 371 (c)(1),
(2), (4) Date: Jan. 5, 2010

(87) PCT Pub. No.: WO2007/009917
PCT Pub. Date: Jan. 25, 2007

(65) Prior Publication Data
US 2010/0108955 A1 May 6, 2010

Related U.S. Application Data

(60) Provisional application No. 60/701,280, filed on Jul. 21, 2005.

(51) Int. Cl.
*H01B 1/00* (2006.01)
*C08G 18/42* (2006.01)
*C08K 3/02* (2006.01)

(52) U.S. Cl.
USPC .......................... 252/500; 524/500; 524/501

(58) Field of Classification Search .................. 252/500; 524/500, 501
See application file for complete search history.

(56) References Cited

U.S. PATENT DOCUMENTS

| | | | | |
|---|---|---|---|---|
| 4,118,439 A | * | 10/1978 | Marze | 525/128 |
| 4,489,180 A | | 12/1984 | Lundberg et al. | |
| 4,497,923 A | | 2/1985 | Lundberg et al. | 524/107 |
| 4,501,834 A | | 2/1985 | Su | 524/28 |
| 4,540,496 A | | 9/1985 | Peiffer et al. | 252/8.5 |
| 4,584,339 A | | 4/1986 | Lundberg et al. | 524/516 |
| 4,839,166 A | | 6/1989 | Grollier et al. | 424/71 |
| 4,942,189 A | | 7/1990 | Peiffer et al. | 523/339 |
| 4,970,260 A | | 11/1990 | Lundberg et al. | 524/516 |
| 5,338,406 A | * | 8/1994 | Smith | 162/168.2 |
| 5,407,583 A | * | 4/1995 | Gill et al. | 210/701 |
| 5,731,034 A | | 3/1998 | Husband | 427/288 |
| 6,030,738 A | | 2/2000 | Michel et al. | 430/108.22 |
| 6,060,410 A | * | 5/2000 | Gillberg-LaForce et al. | 442/118 |
| 6,077,887 A | | 6/2000 | Thuresson | 524/42 |
| 6,228,217 B1 | * | 5/2001 | Dickerson et al. | 162/158 |
| 2003/0163073 A1 | * | 8/2003 | Effing et al. | 602/48 |

FOREIGN PATENT DOCUMENTS

| | | |
|---|---|---|
| EP | 0130732 | 1/1985 |
| JP | 07-062254 | 3/1995 |
| JP | 2004-002490 | 1/2004 |

OTHER PUBLICATIONS

T. Etrych et al., European Journal of Pharmaceutical Sciences, vol. 25, (Jun. 2005), pp. 281-288.
European Journal of Pharmaceutical Sciences, vol. 25, No. 2-3, pp. 281-288, Jun. 2005.

* cited by examiner

*Primary Examiner* — Mark Kopec
*Assistant Examiner* — Jaison Thomas
(74) *Attorney, Agent, or Firm* — Shiela A. Loggins

(57) ABSTRACT

A polyelectrolyte complex composition capable of viscosifying or thickening an aqueous high salt-containing system comprises a mixture of at least one anionic polymer and at least one cationic polymer in an inorganic salt-containing aqueous medium. The anionic polymer and cationic polymer can each be linear and water-soluble, crosslinked and water-soluble, or crosslinked and water-insoluble or swellable.

17 Claims, No Drawings

POLYELECTROLYTE COMPLEXES AS THICKENERS FOR HIGH IONIC STRENGTH SALT SOLUTIONS

This application is the National Stage of International Application PCT/EP 2006/064119, filed Jul. 12, 2006, which claims priority to U.S. Provisional Application No. 60/701,280, filed on Jul. 21, 2005, all of which is herein incorporated by reference.

The present invention relates to a polyelectrolyte complex composition capable of viscosifying or thickening high salt-containing systems. The polyelectrolyte complex composition consists of a cationic polymer and an anionic polymer, either which can be linear and water-soluble, crosslinked and water-soluble, or crosslinked and water-insoluble (or swellable).

BACKGROUND OF THE INVENTION

Viscosifying or thickening aqueous and organic solvents to control the viscosity and rheological behavior of a system using them as diluents can be achieved by using high molecular weight polymers. High molecular weight cationic and anionic polymers or polyelectrolytes are known to be useful as thickening agents in water-based systems. However, conventional polymeric thickeners or viscosification agents are generally poor in effectively viscosifying solutions having a high ionic strength or high salt content. This is especially true for polyelectrolytes such as sodium acrylate homopolymers and copolymers that are used as alkali-soluble thickeners.

Polyelectrolytes achieve high solution viscosity and give a viscosification effect largely through static electric repulsion of the same charges on the polymer chains for an extended dimension in the solution. The extension of the polymer chains tends to collapse under high ionic strength conditions.

U.S. Pat. No. 4,497,923 discloses a process for the viscosification of an organic liquid by mixing an organic solution of anionic polymer (sulfonated ethylene-propylene ionomer) and an organic solution of cationic polymer (copolymer of styrene and vinyl pyridine) to form an interpolymer complex in the organic liquid. The organic solution of the interpolymer complex possesses a higher viscosity than the mean of the separate viscosities of the starting solutions at relatively low solids content and exhibits a shear thickening effect desirable for the intended applications such as antimisting of the solvent. This patent is related to non-aqueous systems in the absence of inorganic salts.

U.S. Pat. No. 4,540,496 (to Exxon) discloses a new family of viscosification agents based on terpolymers of acrylamide (AAm)-sodium styrene sulfonate (SSS)-acrylamidopropytrimethyl ammonium chloride (MAPTAC) for high ionic strength drilling muds. The intramolecular ionic complexing gives improved viscosification power for high ionic strength oil drilling fluids. This patent is not related to interpolymer complexes.

U.S. Pat. No. 4,584,339 (to Exxon) discloses a method for increasing the viscosity of water by an interpolymer complex of a low charge ionic acrylamide copolymer (copolymer of acrylamide and sodium styrene sulfonate and a copolymer of acrylamide and methacrylamidopropyltrimethylammonium chloride. To avoid phase separation of the complex in solution, the charge density along the polymer backbones should be relatively low. The mechanism for the observed viscosity enhancement is believed to be due primarily to the increase in the apparent molecular weight of the complex through formation of intermolecular ionic linkages. Although the viscosity of the individual copolymer components shows normal shear thinning behavior, the water solution of the soluble interpolymer complexes exhibits dilatant (shear thickening) rheological behavior. Upon addition of water-soluble inorganic salts the complex can be disturbed and the viscosity reduced.

U.S. Pat. No. 4,942,189 (to Exxon) teaches interfacial viscosification of aqueous solutions utilizing an interpolymer complex of a neutralized sulfonated polymer (water-insoluble) and a copolymer of styrene/vinylpyridine in a water-insoluble organic solvent. When the organic interpolymer complex solution is mixed with water, a large increase in viscosity is achieved due to the formation of a large number of minute water-filled particles dispersed in the continuous aqueous phase. This patent is related to emulsion systems.

U.S. Pat. No. 4,970,260 (to Exxon) discloses a low charge density polymer complex solution for viscosification of salt-containing solutions. The polymer complex consists of a copolymer of acrylamide with a sulfonate monomer (e.g., sodium styrene sulfonate) as the anionic polymer component and a copolymer of acrylamide with a quaternary ammonium monomer (e.g., methacrylamidopropyltrimethylammonium chloride) as the cationic polymer component. Both the cationic polymer and the anionic polymer for the polymer complex are strong polyelectrolytes with a low charge density (<35% quaternary ammonium monomer for the cationic polymer and <50% sulfonate monomer for the anionic polymer). The claimed polymer solutions contain less than 5% of the low charge density interpolymer complex. The patentees stated that high-charge density interpolymer complexes are rather insoluble in salt-containing solutions and therefore have poor viscosification properties and thickening efficiency. The possibility of forming interpolymer complexes by combination of one strong polyelectrolyte with an oppositely charged weak polyelectrolyte and the combination of two oppositely charged weak polyelectrolytes were not explored and disclosed.

EP-A 0 130 732 (to Halliburton) discloses an anionic polymer composition and its use in stimulating a subterranean formation for enhanced oil recovery. The anionic polymer composition contains <20% of a cationic or amphoteric polymer as dispersing agent in order to prevent the agglomeration of the water-soluble polymers. The anionic polymer composition can contain one or more halide salts such as sodium chloride. Synergism of the viscosity increase through combination of an anionic polymer and a cationic polymer was not observed and was not an effect intended or sought by the inventors. Instead, they found that a cationic polymer could be used to disperse the anionic polymer in salt water and solve the problem of the agglomeration of the water-soluble polymer associated with prior art methods.

U.S. Pat. No. 4,839,166 (to L'Oreal) discloses a thickening agent resulting from the ionic interaction of a grafted cationic cellulose and a polymer of methacrylic acid in hair care compositions which do not contain inorganic salts.

U.S. Pat. No. 5,731,034 (to ECC, International) discloses a method of coating paper using a combination of a cationic polyelectrolyte (polyDADMAC) and an anionic polyelectrolyte (polyacrylate) to disperse calcium carbonate pigments (CCP). No thickening effect on the CCP dispersion is reported. In fact, a low viscosity of CCP dispersions at the same solids is desired for the application of the pigment dispersion. CCP is essentially a water-insoluble salt.

U.S. Pat. No. 6,077,887 (to Akzo) discloses a water-soluble polyelectrolyte complex obtained by combining a hydrophobically-modified copolymer of acrylic acid and acrylamide with a hydrophobically-modified cationic cellulose. The desired one-phase (water-soluble) property of the polyelectrolyte complex can only be achieved by use of hydrophobically modified polyelectrolytes. The polyelectrolyte complex is taught to be usable as a thickening agent in water-based systems. No mention is made of its use in salt-containing solutions.

U.S. Pat. No. 4,501,834 (to Colgate-Palmolive) teaches formation of water-soluble and water-insoluble gels by interpolymer reaction of two strong oppositely charged polyelectrolytes, such as poly(2-acrylamido-2-methylpropane sulfonic acid) and DADMAC polymers, in an aqueous medium free of salt. The interpolymer gels exhibiting a significant increase in viscosity are considered to be useful as foam enhancers and in cosmetic compositions such as shaving gels and shampoos. However, this interpolymer complex is not suitable for systems containing salt as the salt interferes with formation of the gel structure.

In many applications, there is a need to viscosity a high salt-containing system, a highly acidic system, or a highly basic system. Such applications include hair color systems in personal care, drilling fluids for enhanced oil recovery, and hard surface cleaning fluids. Conventional polymeric thickeners or viscosification agents are generally poor in effectively viscosifying a high ionic strength or high salt content solution.

One objective of the present invention is to provide a polyelectrolyte complex (PEC) with a synergistic viscosity increase for salt-containing solutions by combination of oppositely charged polymers.

Another objective of the present invention is to provide a high charge density PEC with a synergistic viscosity increase for salt-containing solutions by combination of one strong polyelectrolyte with an oppositely charged weak polyelectrolyte. The cationic polymer for this PEC has a charge density of greater than 35% of cationic monomer for the cationic polymer or >1.6 meq/g active polymer. The anionic polymer for the PEC has a charge density of greater than 50% of anionic monomer for making the anionic polymer or >2.4 meq/g active copolymer.

Still another objective of the present invention is to provide a high charge density PEC with a synergistic viscosity increase for salt-containing solutions by combination of two oppositely charged weak polyelectrolytes.

SUMMARY OF THE INVENTION

It has been surprisingly discovered that soluble PECs can be formed from high charge density polyelectrolytes in inorganic salt-containing aqueous systems. It has been discovered that a synergistic viscosity increase can be achieved by polyelectrolyte complexes (PECs) formed by mixing oppositely charged polymers with high charge densities in low molecular weight salt (electrolyte) solutions. The PEC has a higher viscosity than the corresponding individual component polymers in the salt water system. It has also been found that the viscosity of the PEC in organic salt solutions increases with increasing pH. The effect of the pH on the PEC's solution viscosity is reversible. The increase in viscosity with an increase in pH becomes very significant when the pH is above 8.0. The PECs of the present invention are useful in thickening or viscosifying high ionic strength aqueous solution systems.

Thus the present invention relates to a polyelectrolyte complex composition capable of viscosifying or thickening an aqueous high salt-containing system, which comprises at least one anionic polymer and at least one cationic polymer in an inorganic salt-containing aqueous medium. The cationic polymer and anionic polymer are each, independently of the other, linear and water-soluble, crosslinked and water-soluble, or crosslinked and water insoluble or swellable. Both the anionic and the cationic polymers used for the PEC composition can be in the form of a solution, emulsion, dispersion, powder or beads.

DESCRIPTION OF THE INVENTION

The polyelectrolyte complex thickening agents for high ionic strength solutions of the present invention are formed by interaction of a mixture of (A) at least one water-soluble anionic polymer and (B) f at least one water-soluble cationic polymer in (C) a low molecular weight salt (or high ionic strength) solution.

Suitable anionic polymers as component (A) for the PEC thickening agent of the present invention include, but are not limited to, polymers containing more than 2, preferably more than 100, and more preferably more than 1000, ionizable anionic groups. These include, but are not limited to, carboxyl (or carboxylate) groups, sulfonic acid (or sulfonate) groups, sulfuric acid (or sulfate) groups, phosphorous acid (or salts), phosphoric acid (or salts), and the like.

The anionic polymers can be natural, modified natural polymers or synthetic polymers. Examples of natural and modified natural anionic polymers are alginic acid (or salts) and carboxymethylcellulose.

Preferred synthetic anionic polymers are polymers obtained from homopolymerization of at least one anionic monomer $I_a$ or copolymerization of $I_a$ with of at least one other copolymerizable monomer II. Suitable anionic monomers $I_a$ include, but are not limited to, (meth)acrylic acid (or salts), maleic acid (or anhydride), styrene sulfonic acid (or salts), vinyl sulfonic acid (or salts), allyl sulfonic acid (or salts), acrylamidopropyl sulfonic acid (or salts), and the like, wherein the salts of the said carboxylic acid and sulfonic acids are neutralized with an ammonium cation or a metal cation selected from the group consisting of Groups IA, IIA, IB and IIB of the Periodic Table of Elements. Preferred ammonium cations are $NH_4^+$, and $^+N(CH_3)_4$ and preferred metal cations are $K^+$ and $Na^+$.

Suitable water-soluble anionic polymers are reaction products of 0.1 to 100 weight percent, preferably 10 to 100 weight percent, and most preferably 50 to 100 weight percent, of at least one anionic monomer $I_a$, 0 to 99.9 weight percent, preferably 0 to 90 weight percent, and most preferably 0 to 50 weight percent, of one or more other copolymerizable monomers II, and optionally, 0 to 10 weight percent of a crosslinking agent III.

Suitable cationic polymers as component (B) for the PEC thickening agent of the present invention include, but are not limited to, polymers containing more than 2, preferably more than 100, and more preferably more than 1000, ionizable anionic groups which include, but are not limited to, primary, secondary, tertiary amines and their salts, and quaternary ammonium and phosphonium salts, and the like.

The cationic polymers can be natural, modified natural polymers or synthetic polymers. Examples of natural and modified natural cationic polymers are chitosan (and salts) and cationic starch.

Preferred synthetic cationic polymers are polymers obtained from homopolymerization of at least one cationic monomer $I_b$ or copolymerization of $I_b$ with a copolymerizable monomer II. Suitable cationic monomers $I_b$ include, but are not limited to, diallyldimethyl ammonium chloride (DADMAC), diallyldimethyl ammonium bromide, diallyldimethyl ammonium sulfate, diallyldimethyl ammonium phosphates, dimethallyldimethyl ammonium chloride, diethylallyl dimethyl ammonium chloride, diallyl di(beta-hydroxyethyl) ammonium chloride, and diallyl di(beta-ethoxyethyl) ammonium chloride, aminoalkyl acrylates such as dimethylaminoethyl acrylate, diethylaminoethyl acrylate, and 7-amino-3,7-dimethyloctyl acrylate, and their salts including their alkyl and benzyl quaternized salts; N,N'-dimethylaminopropyl acrylamide and its salts, allylamine and its salts, diallylamine and its salts, vinylamine (obtained by hydrolysis of vinyl alkylamide polymers) and its salts, vinyl pyridine and its salts, and mixtures thereof.

The most preferred cationic monomers are DADMAC and dimethylaminoethyl acrylate and its salts, including its alkyl and benzyl quaternized salts. Suitable water-soluble cationic polymers are reaction products of 0.1 to 100 weight percent, preferably 10 to 100 weight percent, and most preferably 50 to 100 weight percent, of at least one cationic monomer $I_b$, preferably 0 to 90 weight percent, and most preferably 0 to 50 weight percent, of one or more other copolymerizable monomers II, and optionally, 0 to 10 weight percent of a crosslinking agent III.

Copolymerizable monomers II suitable for use with anionic monomers $I_a$ such as (meth)acrylic acid (or salts) for the anionic polymer and cationic monomers $I_b$ such as DADMAC for the cationic polymer include, without limitation, selected vinyl and (meth)acrylate-based compounds, other unsaturated compounds such as (meth)acrylonitrile and esters of unsaturated polyfunctional acids.

Examples of suitable vinyl compounds for reactant II include, but are not limited to, styrene; vinyl esters of $C_2$ to $C_{18}$ carboxylic acids, such as vinyl acetate and vinyl butyrate; N-vinyl amides of $C_2$ to $C_{18}$ carboxylic acids, such as N-vinyl acetamide, and the like.

The (meth)acrylate based compounds suitable as reactant II include, but are not limited to, esters of (meth)acrylic acid, and amides of (meth)acrylic acid.

Esters of (meth)acrylic acid or (meth)acrylates encompass:

long- and short-chain alkyl (meth)acrylates such as methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, and stearyl (meth)acrylate;

alkoxyalkyl (meth)acrylates, particularly $C_1$-$C_4$alkoxy $C_1$-$C_4$alkyl (meth)acrylates such as butoxyethyl acrylate and ethoxyethoxyethyl acrylate;

aryloxyalkyl (meth)acrylates, particularly aryloxy $C_1$-$C_4$alkyl (meth)acrylates, such as phenoxyethyl acrylate (e.g., Ageflex, Ciba Specialty Chemicals) monocyclic and polycyclic aromatic or non-aromatic acrylates such as cyclohexyl acrylate, benzyl acrylate, dicyclopentadienyl acrylate, dicyclopentanyl acrylate, tricyclodecanyl acrylate, bornyl acrylate, isobornyl acrylate (e.g. Ageflex IBOA, Ciba Specialty Chemicals), tetrahydrofurfuryl acrylate (e.g. SR285, Sartomer Company, Inc.), caprolactone acrylate (e.g. SR495, Sartomer Company, Inc.), and acryloylmorpholine;

alcohol-based (meth)acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003, Henkel Corp.);

amides of (meth)acrylic acid such as diacetone acrylamide, isobutoxymethyl acrylamide, and t-octyl acrylamide; and esters of polyfunctional unsaturated acids such as maleic acid ester and fumaric acid ester.

With respect to the long and short chain alkyl acrylates listed above, a short chain alkyl acrylate is one having an alkyl group with 6 or less carbons and a long chain alkyl acrylate is one having an alkyl group with 7 or more carbons.

Suitable monomers are either commercially available or readily synthesized using reaction schemes known in the art. For example, most of the above-listed acrylate monomers can be synthesized by reacting an appropriate alcohol or amide with an acrylic acid or acryloyl chloride.

Specific examples of preferred compounds for use as other copolymerizable monomers II are exemplified by formula III:

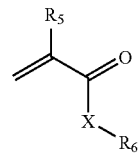

(III)

wherein $R_5$ is H or $CH_3$,

X is a divalent radical —O—, —$NR_7$—, or —NH—;

$R_6$ is $C_1$-$C_{12}$alkyl, $C_1$-$C_{12}$alkoxy, phenyl$C_1$-$C_6$alkylene, wherein the phenyl radical may be unsubstituted or substituted one to three times by $C_1$-$C_{12}$alkyl or $C_1$-$C_{12}$alkoxy, and the $C_1$-$C_6$alkylene group may be interrupted one or more times by oxygen.

Particularly preferred other copolymerizable monomers II are exemplified by:

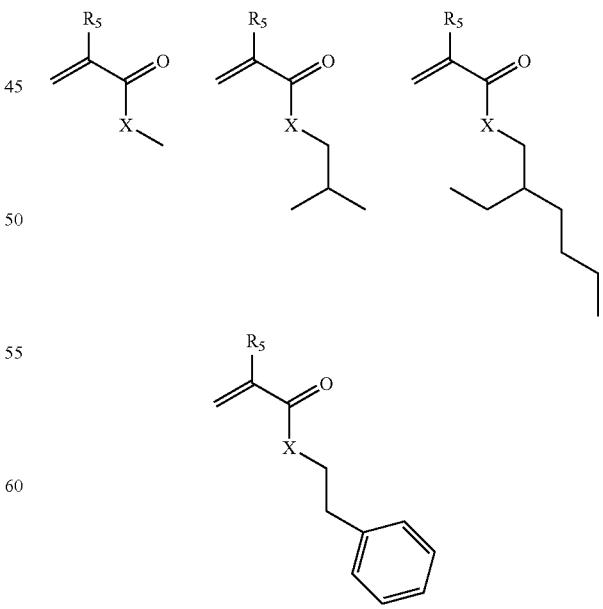

and

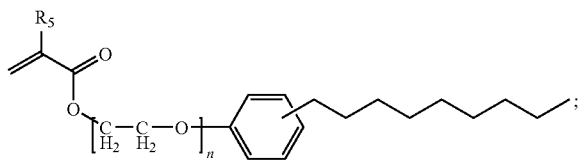

wherein $R_5$ and X are as defined above and n is a number from 1 to 5, preferably 2 or 3.

Suitable crosslinking agents III can be polyfunctional ethylenically unsaturated monomers which include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Henkel Corp., Ambler, Pa.), and propoxylated bisphenol A diacrylate with propoxylation being 2 or greater, preferably ranging from 2 to about 30.

Preferred examples of suitable crosslinking agents III include methylene bisacrylamide, pentaerythritol, di-, tri- and tetra-acrylate, divinylbenzene, polyethylene glycol diacrylate and bisphenol A diacrylate.

The preparation of the preferred anionic polymers (A) and the preferred cationic polymers (B) for the inventive polyelectrolyte complex thickening agent can be carried out using various polymerization techniques such as solution, emulsion, microemulsion, inverse emulsion, and/or bulk polymerization, as well as other technologies that are available to those who are skilled in the art. The polymerizations can be carried out with or without free radical initiators and with various initiator concentrations. The co- or ter-polymers can also be prepared in such a way that the architecture of the polymers is random, block, alternating or core-shell, and with or without the use of polymerization regulators such as nitroxyl ethers or other types of nitroxyl radicals.

Suitable polymers A have a molecular weight ($M_w$) from about 10,000 to about 50,000,000, preferably from about 100,000 to about 20,000,000. Suitable polymers B have a molecular weight of about 1,000 to 5,000,000, preferably from about 10,000 to about 3,000,000.

The complexes of polymer A and polymer B may be prepared by mixing separately prepared high ionic strength solutions of polymer A and polymer B together with agitation. The polyelectrolyte complex of the present invention can also be formed in aqueous solutions as a very highly viscous concentrate or as a solid precipitate. The polyelectrolyte complex can also be prepared from a solid blend of polymer A and polymer B in bead or powder form. The highly viscous material or precipitate or solid blend is then dissolved in a high ionic strength aqueous solution to form thickened salt solutions or high ionic strength solutions of the polyelectrolyte complex of the present invention. The high ionic strength solutions contain from about 0.01 to about 10 weight percent of polyelectrolyte complex from polymer A and polymer B in an aqueous salt-containing medium.

The ratio of polymer B to polymer A, expressed as the molar ratio of mixed cationic charge from polymer B to anionic charge from polymer A, $n^+/n^-$, can range from 0.001 to 1000; preferably it is from 0.1 to 10. The weight ratio of polymer B to polymer A can range from 0.01 to 100, preferably from 0.1 to 10. The high ionic strength solutions of the present invention contain from about 0.001 to 50 weight percent, preferably, depending on the solubility of the added salt, from about 0.01 to 30 weight percent, in water of an inorganic salt, inorganic base or inorganic acid.

Examples of inorganic salts include alkali metal and ammonium sulfates such as sodium sulfate, potassium sulfate, ammonium sulfate, alkali metal and ammonium phosphates such as sodium phosphate and ammonium phosphate, alkali metal and ammonium nitrates or nitrites such as sodium nitrate and sodium nitrite, alkali metal halides such as sodium chloride, potassium chloride, ammonium chloride, and the like. Examples of inorganic acids include hydrochloric acid, sulfuric acid, nitric acid and the like. Examples of inorganic bases include sodium hydroxide and potassium hydroxide.

In one embodiment of the invention a high charge density PEC with a synergistic viscosity increase for salt-containing solutions is obtained by combination of one strong polyelectrolyte with an oppositely charged weak polyelectrolyte. The cationic polymer for this PEC has a charge density of greater than 35% of the cationic monomer used for the cationic polymer or >1.6 meq/g active polymer. The anionic polymer for the PEC has a charge density of greater than 50% of the anionic monomer used for making the anionic polymer or >2.4 meq/g active copolymer.

In one embodiment of the invention polymer A is a weak polyelectrolyte containing weak ionic (or ionizable) groups such as carboxyl groups and polymer B is a strong polyelectrolyte containing strong ionic groups such as quaternary ammonium groups.

In another embodiment of the invention polymer A is a strong polyelectrolyte containing strong ionic groups such as sulfate, sulfonic, phosphate and/or phosphonic groups and polymer B is a weak polyelectrolyte containing weak ionic (ionizable) groups such as primary amine, secondary amine and/or tertiary amine groups.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

Example 1

This example demonstrates the synergistic effectiveness of the polyelectrolyte complex (PEC) in thickening a highly concentrated aqueous salt solution (18% $Na_2SO_4$).

A crosslinked copolymer of sodium acrylate (60%) and acrylamide (40%) at 28% active polymer concentration in the form of a water-in-oil microemulsion is used as the anionic polymer component (=polyacid A). The copolymer of polyacid A contains 60% of charged monomer units and has a charge density of 8.3 meq/g of polymer solids. 20.0 g of polyacid A is added to 90.2 g of an 18% sodium sulfate solution in an 8 oz. glass jar under agitation at room temperature and then mixing is continued for one hour to ensure complete dissolution of the copolymer. The resulting solution 1A contains 5.1% copolymer of polyacid A in an 18% $Na_2SO_4$ solution and has a pH of 7.0.

A homopolymer of diallyldimethyl ammonium chloride (DADMAC) in solid powder form (90.5% solids) is used as the cationic polymer component (=polybase B). The copolymer of polybase B contains 100% of charged monomer units and has a charge density of 6.2 meq/g of polymer solids. 5.12 g of polybase B is added to 90.1 g of an 18% sodium sulfate solution in an 8 oz glass jar under agitation at room temperature and then mixing is continued for one hour to ensure complete dissolution of the DADMAC homopolymer powder. The resulting aqueous solution 1B contains 4.9% poly-DADMAC in 18% $Na_2SO_4$ solution and has a pH of 6.2.

To 50.71 g of solution (1A) containing 5.1% polyacid A in an 8 oz glass jar is added 50.1 g of solution 1B containing 4.9% polybase B under agitation and then mixing is continued for one hour at room temperature. The resulting PEC solution 1C contains 5.0% total polymer solids (2.6% from polyacid A and 2.4% from polybase B) in an 18% $Na_2SO_4$ solution and has a pH of 7.0. The charge ratio of the PEC in solution 1C, ($n^+/n^-$), is 70/100.

The Brookfield viscosities of solutions 1A, 1B and 1C were measured at room temperature (about 23° C.) using spindle LV4 at different rotating speeds (rpm) and shown in Table 1. The PEC system 1C gives a much higher viscosity than either cationic polymer solution 1B or anionic solution 1A that comprise the PEC solution at similar total polymer concentrations (see Table 1). The PEC salt solution 1C also gives a desirable pseudoplastic rheology, i.e. it shows a viscosity which decreases with increasing shear rate.

TABLE 1

Brookfield viscosity vs. shear rate (spindle LV4, rpm) for 5.1% anionic polymer A; 4.9% cationic polymer B; and 5% PEC of A + B (B/A = 1 by wt) in 18% $Na_2SO_4$ salt solution.

| spindle speed, rpm | polyacid A | polybase B | PEC of A and B |
|---|---|---|---|
|  | Brookfield Viscosity (spindle LV4), cps at | | |
|  | 24° C. | 24° C. | 25° C. |
| 3 | 2000 | 22000 | 30600 |
| 6 | 2200 | 15000 | 21600 |
| 12 | 2100 | 10300 | 15000 |
| 30 | 1980 | 5900 | 9180 |
| 60 | 1780 | 3750 | 6260 |

Example 2

This example demonstrates the effect of pH on the ability of the polyelectrolyte complex (PEC) of the present invention to thicken an aqueous highly concentrated salt solution (18% $Na_2SO_4$). The pH of solutions 1A, 1B and 1C prepared in Example 1 are adjusted upward with a 25% NaOH solution and downward with a 95.8% $H_2SO_4$ solution. The Brookfield viscosity (BV) is measured for the solutions after each pH adjustment and thorough mixing. The PEC thickening effect increases with increasing pH as shown in Table 2. A significant increase in BV with increasing pH starts when the pH is above 9.5. As shown in Table 3 the pH also has an effect on polyacid A, but not on polybase B. When the pH is adjusted upward with a 25% NaOH solution, an increase in pH results in increases in BV for both the polyacid solution A and its complex C with the polybase solution B. The effect of pH on the PEC solution C is much more significant than on the polyacid solution A. This indicates that the effect of pH on BV of the PEC solution is mainly due to changes in polyelectrolyte complex structure. Table 4 shows that the pH effect on BV is reversible to a certain degree (with perhaps a hysteretic behavior). After being adjusted to a low pH (2.7), the BV increases significantly when the pH is adjusted back to the original higher values above pH 5.0. The BV increases significantly with increasing pH initially above pH 5 and levels off between pH 7 and 9.

TABLE 2

Effect of pH (adjust upward) on Brookfield viscosity at different shear rates (spindle LV4 rpm) for polyelectrolyte complex C, (5%) in 18% $Na_2SO_4$ solution at 21° C.

| spindle speed rpm | pH = 7.07* | pH = 8.52 | pH = 9.05 | pH = 9.58 | pH = 10.00 | pH = 10.43 |
|---|---|---|---|---|---|---|
|  | Brookfield Viscosity (spindle LV4), cps | | | | | |
| 3 | 36,400 | 41,800 | 44,600 | 54,200 | 80,000 | 140,000 |
| 6 | 25,400 | 28,100 | 30,700 | 36,000 | 50,000 | 82,000 |
| 12 | 17,400 | 18,800 | 20,300 | 23,600 | 31,500 | 51,660 |
| 30 | 10,340 | 11,100 | 11,960 | 13,500 | 17,450 |  |
| 60 | 7,130 | 7,490 | 8,030 | 8,920 | 11,530 |  |

TABLE 3

Effect of pH on Brookfield viscosity for 5.1% anionic polymer A, 4.9% cationic polymer B, and 5% PEC of A + B (B/A = 1 by wt) in 18% $Na_2SO_4$ salt solution.

| Polyacid A | | | | | | |
|---|---|---|---|---|---|---|
| pH | 7.04 | 8.66 | 9.18 | 9.9 | 10.53 | 9.73 |
| BV, cps | 16,000 | 15,200 | 15,400 | 21,300 | 22,000 | 22,100 |
| poly base B | | | | | | |
| pH | 6.15 | 11.8 | | | | |
| BV, cps | 4,000 | 4,600 | | | | |
| PEC of A + B | | | | | | |
| pH | 7.07 | 8.52 | 9.05 | 9.58 | 10.00 | 10.43 |
| BV, cps | 25,400 | 28,100 | 30,700 | 36,000 | 50,000 | 82,000 |

TABLE 4

Effect of pH (adjust down and then up) on Brookfield viscosity at different shear rates (spindle LV4, rpm) for a polyelectrolyte complex (5%) in 18% $Na_2SO_4$ solution at 21° C.

| Adjust pH down | BV, cps | | Adjust pH up | BV, cps | |
|---|---|---|---|---|---|
|  | 1.5 rpm | 3 rpm |  | 1.5 rpm | 3 rpm |
| pH = 10.43 |  | 140,000 | pH = 2.75 |  | 2,600 |
| 10.09 | 233,000 | 160,000 | 3.03 |  | 1,600 |
| 9.79 | 380,000 | 230,714 | 3.64 |  | 5,400 |
| 9.35 | 280,000 | 170,000 | 4.33 |  | 12,000 |
| 5.39 | 255,000 | 152,000 | 4.65 | 170,000 | 106,000 |
| 4.67 | 182,000 | 112,000 | 5.26 | 280,000 | 175,000 |
| 4.19 |  | 4,200 | 6.52 | 355,000 | 221,875 |
| 2.75 |  | 2,600 | 8.18 | 380,000 | 237,500 |

The viscosity increases more with cycles of pH adjustment up-down-up (e.g. to pH 11, back to pH 5, and then up to pH 9) using NaOH (25%) and concentrated $H_2SO_4$ (96%) solutions.

Example 3

This example demonstrates that the synergistic viscosity increase of combining polymer A and polymer B can be realized in a broad charge ratio ($n^+/n^-$) range.

55.46 g of polyacid A similar to that used in Example 1 is added to 250.0 g of an 18% sodium sulfate solution in a 600 ml beaker under agitation at room temperature and mixed for one hour to ensure complete dissolution of the copolymer. The resulting solution (3A) contains 5.1% of polyacid A in the $Na_2SO_4$ solution and has a pH of 7.2.

16.5 g of the same polybase B as used in Example 1 is added to 290.0 g of an 18% sodium sulfate solution in a 600 ml beaker under agitation at room temperature and mixed for one hour to ensure complete dissolution of the DADMAC homopolymer powder. The resulting solution (3B) contains 4.9% polyDADMAC in the $Na_2SO_4$ solution and has a pH of 6.2.

Five $Na_2SO_4$ solutions of 5% PEC with charge ratios ($n^+/n^-$) of 15/100, 72/100, 100/100, 100/70 and 100/15 are prepared by mixing solutions 3A ($n^+/n^-$=0/100) and 3B ($n^+/n^-$=100/0) in weight ratios of 0.21, 1.01, 1.41, 2.01 and 9.40, respectively, in beakers and stirring for about 1 hour; then stored at room temperature for 2 days before measuring the Brookfield viscosity. Table 5 shows the Brookfield viscosity at 23° C. measured with spindle LV 4 at 60 rpm for the five PEC solutions and the 3A solution of polyacid A and the 3B solution of polybase B that were: used to make to the PEC. The PEC solutions have higher values of viscosity than those of either cationic polymer solution (3B, n+/n−=100/0) or anionic solution (3A, n+/n−=0/100) that comprise the PEC solution at similar total polymer concentrations as shown in Table 5.

TABLE 5

Brookfield viscosity vs. charge ratio for 5% PEC in 16% $Na_2SO_4$ salt solution after 2 days storage

| Charge ratio, $n^+/n^-$ | BV(LV4, 60 rpm), cps |
|---|---|
| 0/100 | 3600 |
| 15/100 | 5540 |
| 72/100 | 6030 |
| 100/100 | 5030 |
| 100/70 | 5340 |
| 100/15 | 2420 |
| 100/0 | 2200 |

Example 4

This example demonstrates that components for polyelectrolyte complexes can be prepared in the form of a redispersible emulsion slurry which forms the PEC in situ to thicken a salt-containing solution when added and mixed with the salt-containing solution.

Preparation of emulsion slurry: to 122.8 g of a crosslinked copolymer of sodium acrylate (60%) and acrylamide (40%) at 28% active polymer concentration in the form of a water-in-oil microemulsion is added under agitation 35.9 g of a homopolymer of diallyldimethyl ammonium chloride (DADMAC) in 90% solids bead form and mixed for about 10 minutes. The obtained emulsion slurry is stable for redispersion for more than 3 months and has the following properties.

Appearance: emulsion slurry
Active polymer solids: 42.0 weight percent
pH: 7 (5% in 18% $Na_2SO_4$ solution).

Example 5

This example demonstrates that the emulsion slurry prepared in example 4 can be used to form a PEC in situ for thickening an 18% $Na_2SO_4$ solution.

12.60 g of the emulsion slurry (mixed well before use) prepared in Example 4 is added to the vortex of a salt solution containing 93.24 g of 18% $Na_2SO_4$ while stirring with a propeller agitator at about 500 to 1000 rpm. Mixing is continued for about one hour.

TABLE 6

Brookfield viscosity of a 5% polymer solids solution in 18% sodium sulfate salt prepared with high-speed agitation (1000 rpm).

| Time | pH | Temp, ° C. | Brookfield viscosity (spindle LV4), cps | | | |
|---|---|---|---|---|---|---|
| | | | 6 rpm | 12 rpm | 30 rpm | 60 rpm |
| Just prepared | 7.0 | 25 | 7500 | 5700 | 3900 | 2830 |
| pH adjusted | 9.6 | 25 | 8400 | 6450 | 4340 | 3100 |
| 16 hrs stored at RT | | 24 | 27900 | 17500 | 9980 | 6230 |
| 40 hrs stored at RT | | 24 | 36000 | 22800 | 12640 | 7800 |
| 110 hrs stored at RT | 9.5 | 24 | 36000 | 23000 | 12600 | 7800 |

The table above shows the thickening effect of the PEC increases with increasing pH.

The PEC-thickened salt solution exhibits pseudoplastic rheology behavior (viscosity decreases significantly with shear rate) and thixotropic rheology behavior (viscosity decreases with increasing agitation time). The viscosity will be relatively low when just prepared with high speed agitation but will recover to a high value after standing still in storage. The initial viscosity will be high if the solution is prepared with low shear mixing such as shaking or tumbling.

We claim:

1. A polyelectrolyte complex composition capable of viscosifying or thickening an aqueous high salt-containing system, which comprises a mixture of at least one anionic polymer and at least one cationic polymer in an inorganic salt-containing aqueous medium, wherein the anionic polymer has a charge density of greater than 50% of the anionic monomer used to make the anionic polymer or >2.4 meq/g active copolymer, and the cationic polymer has a charge density of greater than 35% of the cationic monomer used to make the cationic polymer or >1.6 meq/g active polymer and the anionic polymer is a weak polyelectrolyte and the cationic polymer is a strong polyelectrolyte or the anionic polymer is a strong polyelectrolyte and the cationic polymer is a weak polyelectrolyte.

2. The polyelectrolyte complex according to claim 1, wherein the anionic polymer and cationic polymer are each, independently of the other, linear and water-soluble, crosslinked and water-soluble, or crosslinked and water insoluble or swellable.

3. The polyelectrolyte complex according to claim 1, wherein the anionic polymer contains carboxyl, sulfonic acid, sulfuric acid, phosphorous acid or phosphoric acid groups, and/or salts thereof.

4. The polyelectrolyte complex according to claim 1, wherein the anionic polymer is a reaction product of 0.1 to 100 weight percent of at least one anionic monomer $I_a$, 0 to 99.9 weight percent of one or more other copolymerizable monomers II, and optionally, 0 to 10 weight percent of a crosslinking agent.

5. The polyelectrolyte complex according to claim 4, wherein the anionic polymer is obtained from homopolymerization of at least one anionic monomer $I_a$ or copolymerization of $I_a$ with of at least one other copolymerizable monomer II, in which the anionic monomer is selected from (meth) acrylic acid (or salts), maleic acid (or anhydride), styrene sulfonic acid (or salts), vinyl sulfonic acid (or salts), allyl sulfonic acid (or salts), acrylamidopropyl sulfonic acid (or salts), or mixtures thereof, wherein the salts of the said carboxylic acid and sulfonic acids are neutralized with an ammonium cation or a metal cation selected from the group consisting of Groups IA, IIA, IB and IIB of the Periodic Table of Elements.

6. The polyelectrolyte complex according to claim 4, wherein the copolymerizable monomer is acrylamide or an ester of (meth)acrylate.

7. The polyelectrolyte complex according to claim 1, wherein the cationic polymer is a reaction product of 0.1 to 100 weight percent of at least one cationic monomer $I_b$, 0 to 99.9 weight percent of one or more other copolymerizable monomers II, and optionally, 0 to 10 weight percent of a crosslinking agent.

8. The polyelectrolyte complex according to claim 7, wherein the cationic polymer is obtained from homopolymerization of at least one cationic monomer $I_b$ or copolymerization of $I_b$ with a copolymerizable monomer II, wherein the cationic monomer is selected from diallyldimethyl ammonium chloride, diallyldimethyl ammonium bromide, diallyldimethyl ammonium sulfate, diallyldimethyl ammonium phosphates, dimethallyldimethyl ammonium chloride, diethylallyl dimethyl ammonium chloride, diallyl di(beta-hydroxyethyl) ammonium chloride, and diallyl di(beta-ethoxyethyl) ammonium chloride; aminoalkyl acrylates; N,N'-dimethylaminopropyl acrylamide and its salts, allylamine and its salts, diallylamine and its salts, vinylamine and its salts, vinyl pyridine and its salts, and mixtures thereof.

9. The polyelectrolyte complex according to claim 1, wherein the cationic polymer contains groups selected from primary, secondary, and tertiary amines and their salts, and quaternary ammonium and phosphonium salts, and mixtures thereof.

10. The polyelectrolyte complex according to claim 1, wherein the ratio of the cationic polymer to the anionic polymer, expressed as the molar ratio of mixed cationic charge from the cationic polymer to the anionic polymer, $n^+/n^-$, ranges from 0.001 to 1000.

11. The polyelectrolyte complex according to claim 10, wherein the ratio of the cationic polymer to the anionic polymer, expressed as the molar ratio of mixed cationic charge from the cationic polymer to the anionic polymer, $n^+/n^-$, ranges from 0.1 to 10.

12. The polyelectrolyte complex according to claim 1, wherein the anionic polymer contains weakly ionic carboxyl groups and the cationic polymer contains strongly ionic quaternary ammonium groups.

13. The polyelectrolyte complex according to claim 1, wherein the anionic polymer contains strongly ionic sulfate, sulfonic, phosphate or phosphonic groups and the cationic polymer contains weakly ionic primary, secondary or tertiary amino groups.

14. The polyelectrolyte complex according to claim 1, wherein the anionic polymer is a copolymer of acrylic acid and a copolymerizable monomer in a molar ratio ranging from 1 to 0.001 and the cationic polymer is a copolymer of diallyldimethyl ammonium chloride and a copolymerizable monomer in molar ratio ranging from 1 to 0.001.

15. The polyelectrolyte complex according to claim 1, wherein the anionic polymer is a copolymer of sodium acrylate in water-in-oil emulsion form and the cationic polymer is a homopolymer of diallyldimethyl ammonium chloride.

16. A method of increasing the viscosity of a salt solution of the polyelectrolyte complex according to claim 1, which comprises
   a) increasing the pH of the salt solution of the polyelectrolyte complex to above pH 8.0 with a base; or
   b) after the step a), decreasing the pH of the salt solution of the polyelectrolyte complex to below pH 5 with an acid and then adjusting the pH back to above 8.0 with a base.

17. A method of preparing a thickened aqueous inorganic salt-containing solution of the polyelectrolyte complex as defined in claim 1, which comprises
   a) mixing separately prepared high ionic strength aqueous solutions of at least one anionic polymer and at least one cationic polymer together with agitation, or
   b) forming a highly viscous polyelectrolyte concentrate in an aqueous solution or a solid precipitate, and then dissolving said polyelectrolyte concentrate or precipitate in a high ionic strength aqueous solution, or
   c) preparing a solid blend comprising at least one anionic polymer and at least one cationic polymer in bead or powder form, and then dissolving said solid blend in a high ionic strength aqueous solution.

\* \* \* \* \*